United States Patent
Sawada

(10) Patent No.: US 7,362,470 B2
(45) Date of Patent: Apr. 22, 2008

(54) COLOR IMAGE PROCESSING APPARATUS

(75) Inventor: Takayuki Sawada, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 361 days.

(21) Appl. No.: 11/082,048

(22) Filed: Mar. 17, 2005

(65) Prior Publication Data

US 2006/0209323 A1    Sep. 21, 2006

(51) Int. Cl.
   *G06K 15/00* (2006.01)
(52) U.S. Cl. .................. 358/1.9; 358/2.1; 358/1.11; 358/538; 358/518; 382/167; 382/176
(58) Field of Classification Search ............. 358/1.9, 358/2.1, 501, 518, 3.26, 1.11, 538; 382/165, 382/167, 176, 266, 274, 282
See application file for complete search history.

(56) References Cited

U.S. PATENT DOCUMENTS 6,567,544 B1 * 5/2003 Kanno et al. ............. 382/169

FOREIGN PATENT DOCUMENTS

JP    2002-262108 A    9/2002

* cited by examiner

*Primary Examiner*—King Y. Poon
*Assistant Examiner*—Jamares Washington
(74) *Attorney, Agent, or Firm*—Foley & Lardner LLP

(57) ABSTRACT

A color image processing apparatus uses a layout analysis section, a character/background color extraction section, an input image character/background color difference calculation section, an output image character/background color difference estimation section and a color conversion parameter correction section, thereby executing a process (pre-process) for generating a second color conversion parameter, and then uses a first color conversion section, a second color conversion section and a color conversion switching section, thereby executing color conversion (main process) of input color image data.

8 Claims, 4 Drawing Sheets
(2 of 4 Drawing Sheet(s) Filed in Color)

COLOR IMAGE PROCESSING APPARATUS

BACKGROUND OF THE INVENTION

1. Field of the Invention

The present invention relates to a color image processing apparatus that executes an image process in color document printing.

2. Description of the Related Art

In the prior art, a color reproduction mode, such as "character mode", is provided as a method of printing with good character readability in the printing-out of a color document image. This method is based on the intention of making characters (color characters) clearer and easier to read, by executing color reproduction with generally high chroma saturation. However, since color conversion (parameter) itself is fixedly set, a character/background color difference may decrease after color conversion, depending on a combination of a character color and a background color, resulting in poor character readability. To cope with this problem, there is known a method in which the color of a character is varied in association with a background color from location to location in an image, thereby compensating a character/background contrast.

In this method, however, the color of a passage or a character string, which is created with a preset color, may vary depending on locations, leading to a print result that differs from the intention of creation.

BRIEF SUMMARY OF THE INVENTION

The object of an aspect of the present invention is to provide a color image processing apparatus capable of executing an image process for color reproduction of a color document image with high readability.

According to an aspect of the present invention, there is provided a color image processing apparatus comprising: layout analysis means for discriminating a photo region and a non-photo region in input color image data, generating and outputting page layout attribute information at each of pixel positions in the image data, and outputting non-photo region image data; character/background color extraction means for extracting a combination of character color data and background color data that appear in the non-photo region image data; input image character/background color difference calculation means for calculating a character/background input color difference in the input image data with respect to the extracted combination of the character color and background color; output image character/background color difference estimation means for estimating and outputting a character/background output color difference in the output image data with respect to the extracted combination of the character color and background color; color conversion parameter correction means for correcting a first color conversion parameter with respect to the extracted character color and background color on the basis of a relationship between the input color difference and the output color difference, and outputting a second color conversion parameter that is a correction result; first color conversion means for executing color conversion of the input color image data on the basis of the first color conversion parameter; second color conversion means for executing color conversion of the input color image data on the basis of the second color conversion parameter; and color conversion switching means for selecting and outputting, on the basis of the page layout information that is supplied from the layout analysis means, a color conversion result, which is delivered from the first color conversion means, as output color image data in a case where a pixel of interest belongs to the photo region, and selecting and outputting a color conversion result, which is delivered from the second color conversion means, as output color image data in a case where a pixel of interest belongs to the non-photo region.

According to another aspect of the present invention, there is provided a color image processing apparatus comprising: a layout analysis section that discriminates a photo region and a non-photo region in input color image data, generates and outputs page layout attribute information at each of pixel positions in the image data, and outputs non-photo region image data; a character/background color extraction section that extracts a combination of character color data and background color data that appear in the non-photo region image data; an input image character/background color difference calculation section that calculates a character/background input color difference in the input image data with respect to the extracted combination of the character color and background color; an output image character/background color difference estimation section that estimates and outputs a character/background output color difference in the output image data with respect to the extracted combination of the character color and background color; a color conversion parameter correction section that corrects a first color conversion parameter with respect to the extracted character color and background color on the basis of a relationship between the input color difference and the output color difference, and outputs a second color conversion parameter that is a correction result; a first color conversion section that executes color conversion of the input color image data on the basis of the first color conversion parameter; a second color conversion section that executes color conversion of the input color image data on the basis of the second color conversion parameter; and a color conversion switching section that selects and outputs, on the basis of the page layout information that is supplied from the layout analysis section, a color conversion result, which is delivered from the first color conversion section, as output color image data in a case where a pixel of interest belongs to the photo region, and selects and outputs a color conversion result, which is delivered from the second color conversion section, as output color image data in a case where a pixel of interest belongs to the non-photo region.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The patent of application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

An embodiment of the present invention will now be described with reference to the accompanying drawings.

Figure 1:
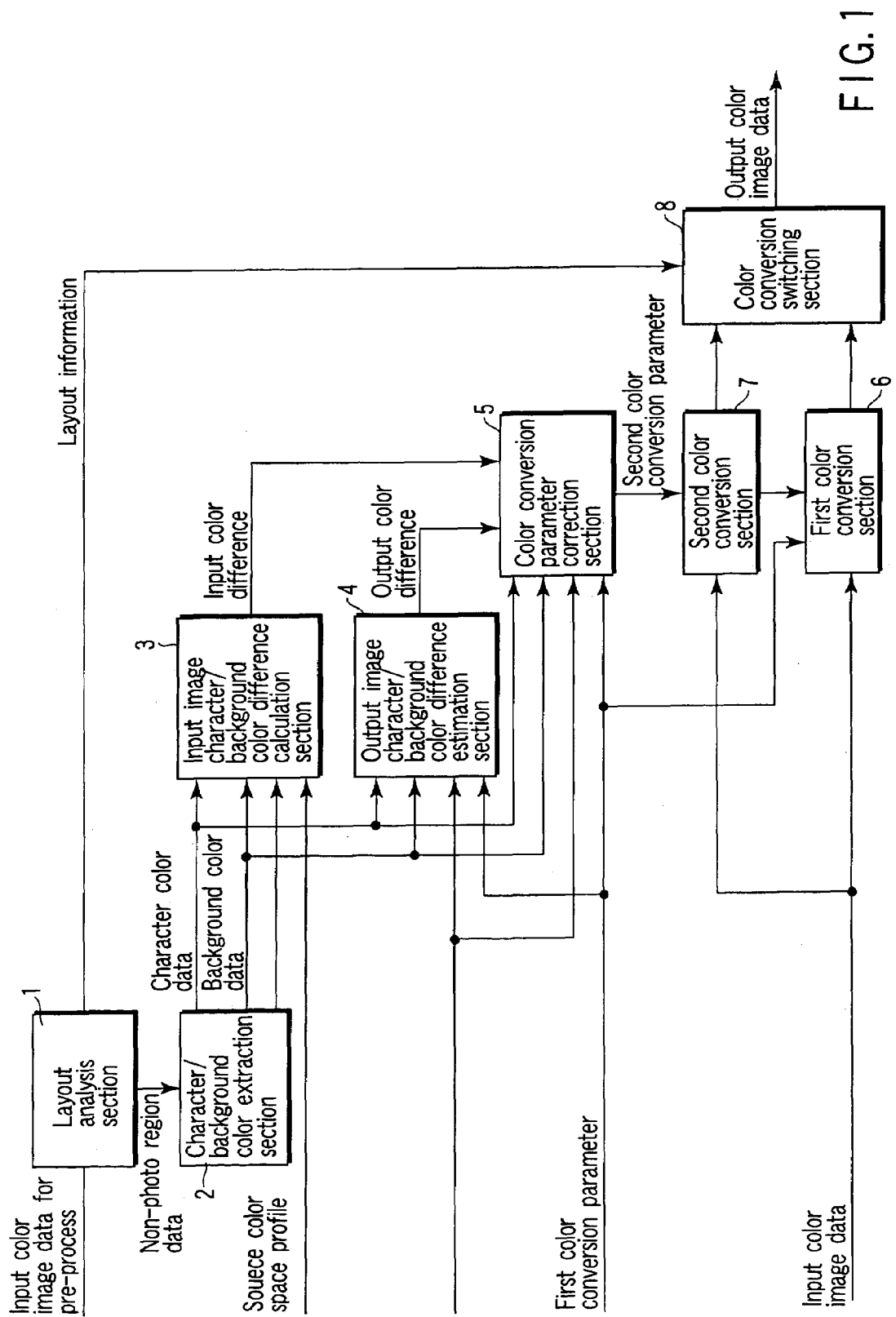
FIG. 1 is a block diagram that schematically shows the structure of a color image processing apparatus according to the present invention.

FIG. 1 schematically shows the structure of a color image processing apparatus according to the present invention. The color image processing apparatus of this invention comprises a layout analysis section 1, a character/background color extraction section 2, an input image character/background color difference calculation section 3, an output image character/background color difference estimation section 4, a color conversion parameter correction section 5, a first color conversion section 6, a second color conversion section 7, and a color conversion switching section 8.

The layout analysis section 1 executes region division to divide color image data, which is input in precedence for pre-processing, into a photo region and a non-photo region, and extracts layout information that represents a result of the region division.

The character/background color extraction section 2 extracts a pair of a character color and a background color, which appear in the non-photo region data.

The input image character/background color difference calculation section 3 converts the character color data and background color data to color coordinate values of a color space for color difference calculation.

The output image character/background color difference estimation section 4 once converts the color character data and background color data to a color space (destination color space) for output color image data.

Based on the pair of character color data and background color data, the input color difference and the output color difference, the color conversion parameter correction section 5 corrects a color conversion parameter that is a non-corrected color conversion parameter, and generates a second color conversion parameter that is a correction result.

The first color conversion section 6 executes color conversion of input color image data on the basis of the first color conversion parameter that is the non-corrected color conversion parameter.

The second color conversion section 7 executes color conversion of input color image data on the basis of the second color conversion parameter.

The color conversion switching section 8 selects one of a first color conversion result and a second color conversion result, on the basis of the layout information. That is, in a case where a layout attribute of a pixel of interest in the input color image data is a photo region, the color conversion switching section 8 selects the first color conversion result. In a case where a layout attribute of a pixel of interest in the input color image data is a non-photo region, the color conversion switching section 8 selects the second color conversion result. The color conversion switching section 8 outputs the selected color conversion result as pixel data of output color image data.

As regards the operation of the present invention, a process (pre-process) for generating the second color conversion parameter is executed, following which color conversion (main process) for input color image data is executed.

Of the structural elements shown in FIG. 1, the layout analysis section 1, character/background color extraction section 2, input image character/background color difference calculation section 3, output image character/background color difference estimation section 4 and color conversion parameter correction section 5 execute the pre-process.

On the other hand, the first color conversion section 6, second color conversion section 7 and color conversion switching section 8 execute the main process.

Next, each of the process blocks that execute the pre-process and main process is described.

The layout analysis section 1 executes region division to divide color image data, which is input in precedence for the pre-process, into a photo region and a non-photo region, and delivers layout information that represents a result of the region division to the color conversion switching section 8. In addition, layout analysis section 1 delivers the non-photo region data, which is divided by the region division, to the character/background color extraction section 2.

The character/background color extraction section 2 extracts a pair of a character color and a background color, which appear in the non-photo region data that is delivered from the layout analysis section 1. In general, a plurality of pairs of character colors and background colors are extracted. The extracted pair of character color data and background color data are supplied to the input image character/background color difference calculation section 3, output image character/background color difference estimation section 4 and color conversion parameter correction section 5.

The input image character/background color difference calculation section 3 converts the character color data and background color data, which are delivered from the character/background color extraction section 2, to color coordinate values of a color space for color difference calculation. A uniform color space L*a*b* is used as the color space for color difference calculation. The conversion to the color space for color difference calculation is executed with reference to a source color space profile in which characteristics of a color space (source color space) of input color image data are described. As the source color space profile, an ICC profile-format data file, which is stipulated by the International Color Consortium, is used. At last, a color difference (input color difference) between both data is calculated. In the L*a*b* color space, the calculation formula for the color difference is defined by $$\Delta E = \sqrt{(\Delta L^*)^2 + (\Delta a^*)^2 + (\Delta b^*)^2} \qquad \text{(Equation 1)}$$

In place of ΔE, a brightness difference ΔL* may be output as an input color difference, in consideration of the fact that a brightness contrast with the background is a dominant factor for character readability. The number of input color differences, which are output to the color conversion parameter correction section 5, corresponds to the number of pairs of character/background colors that are delivered from the character/background color extraction section 2.

The output image character/background color difference estimation section 4 once converts the color character data and background color data, which are delivered from the character/background color extraction section 2, to a color space (destination color space) for output color image data. In this conversion, a first color conversion parameter, which is a non-corrected color conversion parameter, is used. By this conversion, it is found, in advance, to which colors the character color and background color are to be converted in the non-corrected state.

Subsequently, color coordinate values of the destination color space are converted to color coordinate values of the color space for color difference calculation. The conversion to the color space for color difference calculation is executed with reference to a destination color space profile in which characteristics of a destination color space are described. An ICC profile-format data file is also used for the destination color space profile. At last, a color difference (output color difference) between the character and background is calculated. The calculation formula for the color difference is defined by the above-mentioned equation 1. However, for the same reason, in place of $\Delta E$, a brightness difference $\Delta L^*$ may be output as an input color difference. The number of output color differences, which are output to the color conversion parameter correction section 5, corresponds to the number of pairs of character/background colors that are delivered from the character/background color extraction section 2.

The color conversion parameter correction section 5 corrects the first color conversion parameter that is the non-corrected color conversion parameter, based on the pair of character color data and background color data that are delivered from the character/background color extraction section 2, the input color difference that is delivered from the input image character/background color difference calculation section 3 in association with the pair of character color data and background color data, and the output color difference that is delivered from the output image character/background color difference estimation section 4 in association with the pair of character color data and background color data. Thereby, the color conversion parameter correction section 5 generates a second color conversion parameter that is a correction result, and delivers it to the second color conversion section 7.

At least two rules for the correction in the color conversion parameter correction section 5 are applicable:

(1) A difference (color-difference increment), which is obtained by subtracting the input color difference from the output color difference between the character color and background color, is evaluated. If the color-difference increment is less than a threshold, a component relating to either or both of the character color and background color is corrected so that the color-difference increment may become the threshold or more.

(2) A ratio (color-difference ratio) of the output color difference to the input color difference between the character color and background color is evaluated. If the color-difference ratio is less than a threshold, a component relating to either or both of the character color and background color is corrected so that the color-difference ratio may become the threshold or more.

In each of the rules (1) and (2), a brightness difference may be used as the color difference.

Figure 2:
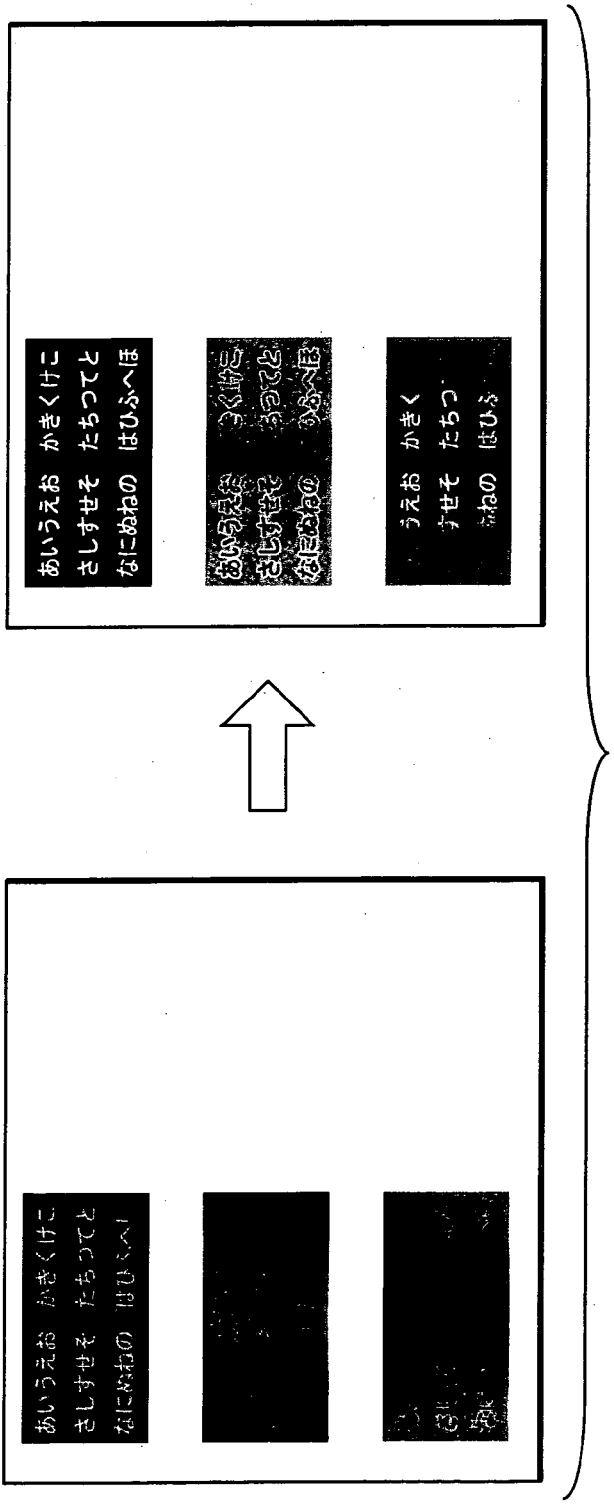
FIG. 2 shows an example of correction of a color conversion parameter.

FIG. 2 shows an example in which the above-described correction rule is applied. As shown in FIG. 2, characters stand out from the background, with enhanced readability.

Figure 3:
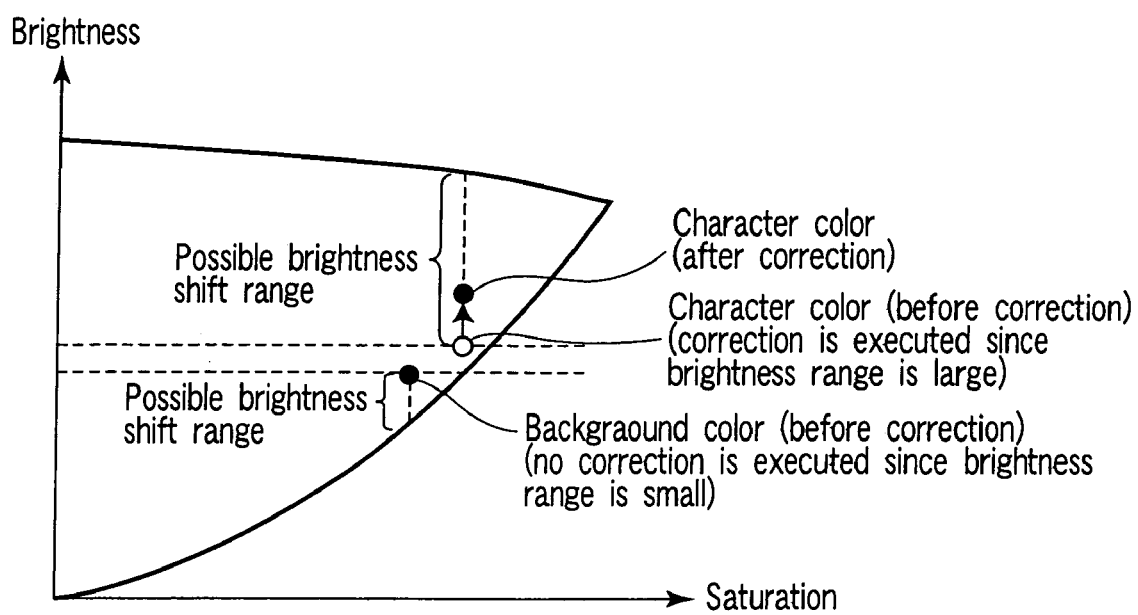
FIG. 3 illustrates an example of a method of correcting a color conversion parameter.

In order to set the color-difference increment or color-difference ratio at a threshold or more, one of the brightness of a character color and the brightness of a background color, which has a greater possible brightness shift range, is corrected in such a direction as to increase the brightness difference between the character color and background color, while the hue and saturation are kept constant (see FIG. 3).

The color conversion parameter correction section 5 calculates an output color difference between the corrected character color and background color by referring to the destination color space profile, using the same method as in the output image character/background color difference estimation section 4. The color conversion parameter correction section 5 determines whether the color-difference increment or color-difference ratio has become the threshold or more, and repeats correction until the color-difference increment or color-difference ratio becomes the threshold or more.

Further, the color conversion parameter correction section 5 repeats this process by a number of times corresponding to the number of pairs of character/background colors that are supplied from the character/background color extraction section 2. Thus, the color conversion parameter correction section 5 completes the generation of the second color conversion parameter.

The above is the description relating to the pre-process.

Next, the main process and each of the process blocks that execute the main process are described.

The first color conversion section 6 executes color conversion of input color image data on the basis of the first color conversion parameter that is the non-corrected color conversion parameter, and delivers a color conversion result to the color conversion switching section 8.

The second color conversion section 7 executes color conversion of input color image data on the basis of the second color conversion parameter that is the correction result delivered from the color conversion parameter correction section 5, and delivers a color conversion result to the color conversion switching section 8.

The color conversion switching section 8 selects one of a first color conversion result, which is delivered from the first color conversion section 6, and a second color conversion result, which is delivered from the second color conversion section 7, on the basis of the layout information that is supplied from the layout analysis section 1. That is, in a case where a layout attribute of a pixel of interest in the input color image data is a photo region, the color conversion switching section 8 selects the first color conversion result. In a case where a layout attribute of a pixel of interest in the input color image data is a non-photo region, the color conversion switching section 8 selects the second color conversion result. The color conversion switching section 8 outputs the selected color conversion result as pixel data of output color image data (see FIG. 4).

As has been described above, according to the embodiment of the invention, the character/background color difference of an output image is evaluated in advance, and compensation is executed when the evaluated color difference is less than the color difference of the input image. Thus, a good character/background contrast is always ensured, and characters with high readability can be output.

The compensation of color difference (contrast) is realized by correcting a color conversion parameter prior to processing of an input image. Thus, the manner of compensation in one input image is unchanged, and does not vary from pixel to pixel. Therefore, characters of the same color in the input image always have the same color in the output image, too.

Based on the layout analysis result, the second color conversion that is the corrected color conversion is applied to only the non-photo region, and the first color conversion that is the non-corrected color conversion is applied to the photo region. Therefore, no distortion occurs due to correction in the photo region.

The second color conversion parameter is commonly applied to the character color and background color in the non-photo region. Thus, there is no need to discriminate between a character part proper and a background at the time of color conversion, and the execution of the color conversion process is relatively easy. In other words, it should suffice if the character color and background color are extracted when the color conversion parameter is to be corrected prior to the color conversion.

Figure 4:
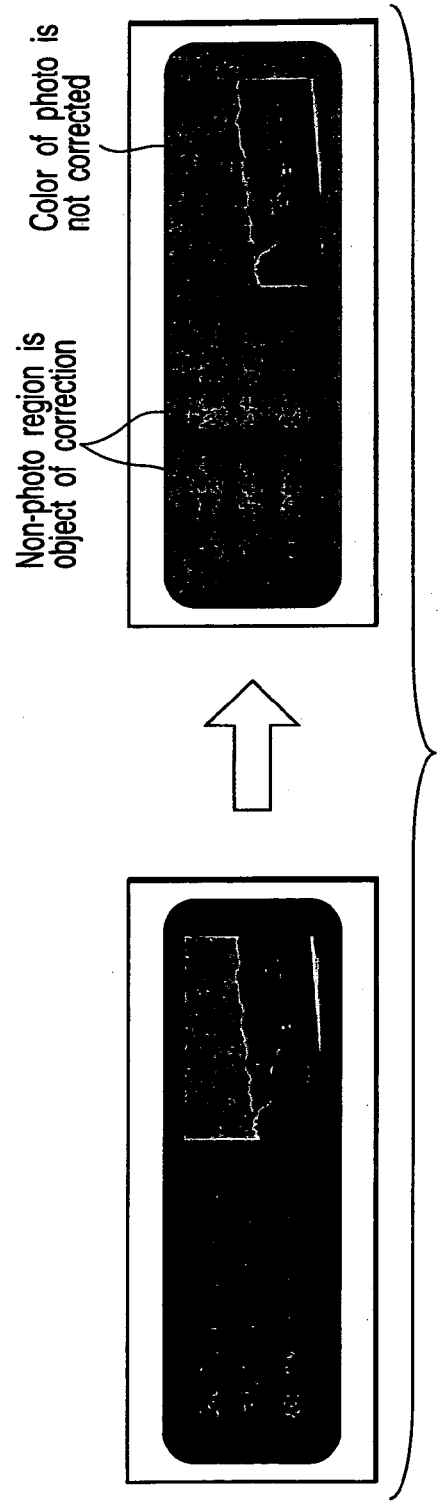
FIG. 4 shows a preferable correction result that is obtained when the entirety of a non-photo region is corrected.
Figure 5:
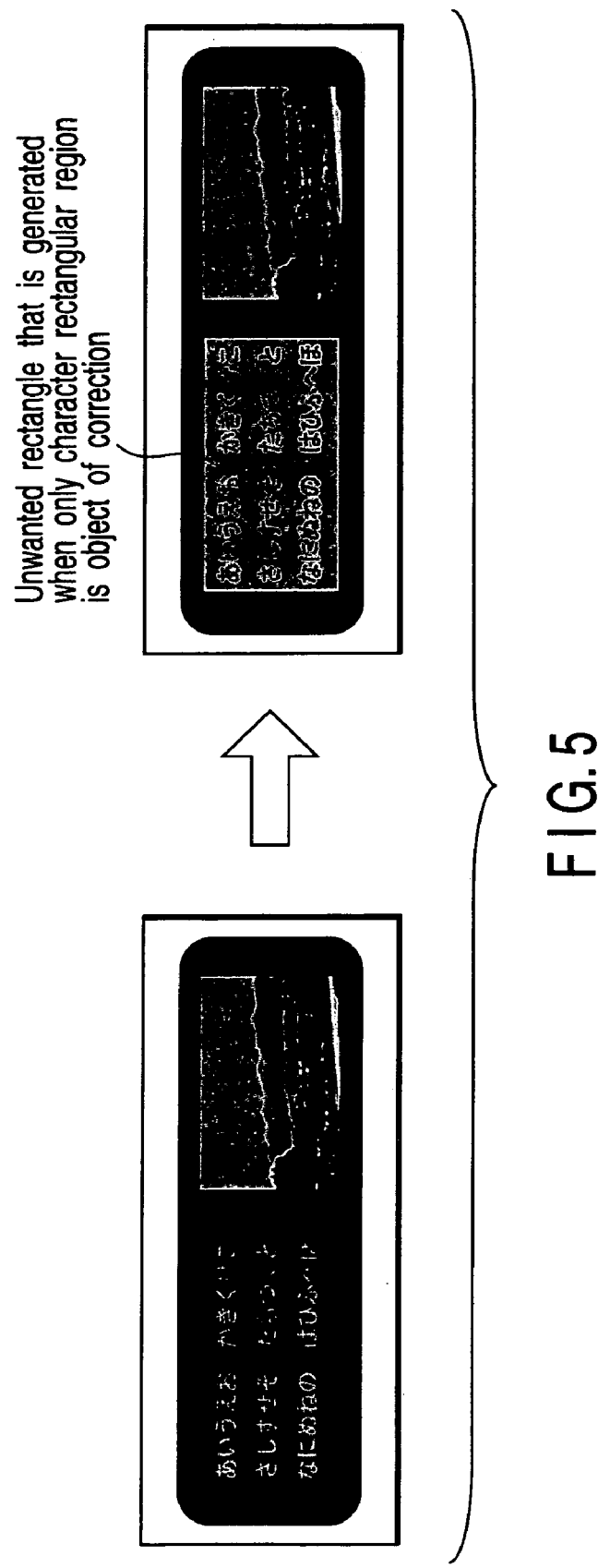
FIG. 5 is a view for explaining a problem that occurs when only a character rectangular region is corrected.

Furthermore, the second color conversion is applied to the entire non-photo region (FIG. 4). Unlike the case in which the second color conversion is applied to only the character region (a rectangular region including the character part proper and peripheral background part) in the non-photo region, an error such as generation of an unwanted boundary line does not occur (see FIG. 5).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus comprising:
   layout analysis means for discriminating a photo region and a non-photo region in input color image data, generating and outputting page layout attribute information at each of pixel positions in the image data, and outputting non-photo region image data;
   character/background color extraction means for extracting color data and background color data that appear in the non-photo region image data;
   input image character/background color difference calculation means for converting the character color data and the background color data extracted by the character/background color extraction means into a first color coordinate value and a second color coordinate value of a uniform color space, respectively, and calculating an input color difference between the character color data and background color data in the input image data by using the first color coordinate value and the second color coordinate value;
   output image character/background color difference estimation means for converting the character color data and the background color data extracted by the character/background color extraction means into a third color coordinate value and a fourth color coordinate value of color space for output color image data, respectively, converting the third color coordinate value and the fourth color coordinate value into fifth color coordinate value and sixth color coordinate value of the uniform color space, respectively, estimating an output color difference between the character color data and the background color data in the output image data from the fifth color coordinate value and the sixth color coordinate value, and outputting the estimated output color difference as data;
   color conversion parameter correction means for correcting a first color conversion parameter with respect to the extracted character color and background color on the basis of a relationship between the input color difference and the output color difference, and outputting a second color conversion parameter that is a correction result;
   first color conversion means for executing color conversion of the input color image data on the basis of the first color conversion parameter;
   second color conversion means for executing color conversion of the input color image data on the basis of the second color conversion parameter; and
   color conversion switching means for selecting and outputting, on the basis of the page layout information that is supplied from the layout analysis means, a color conversion result, which is delivered from the first color conversion means, as output color image data in a case where a pixel of interest belongs to the photo region, and selecting and outputting a color conversion result, which is delivered from the second color conversion means, as output color image data in a case where a pixel of interest belongs to the non-photo region.

2. The color image processing apparatus according to claim 1, wherein the input image character/background color difference calculation means and the output image character/background color difference estimation means calculate brightness differences as character/background color differences that are to be delivered to the color conversion parameter correction means.

3. The color image processing apparatus according to claim 1, wherein only in a case where a color-difference increment, which is obtained by subtracting the input color difference from the output color difference is less than a predetermined threshold, the color conversion parameter correction means corrects either or both of the character color and background color in the color conversion parameter such that the color-difference increment becomes the threshold or more.

4. The color image processing apparatus according to claim 1, wherein only in a case where a color-difference ratio of the output color difference to the input color difference is less than a predetermined threshold, the color conversion parameter correction means corrects either or both of the character color and background color in the color conversion parameter such that the color-difference ratio becomes the threshold or more.

5. A color image processing apparatus comprising:
   a layout analysis section that discriminates a photo region and a non-photo region in input color image data, generates and outputs page layout attribute information at each of pixel positions in the image data, and outputs non-photo region image data;
   a character/background color extraction section that extracts character color data and background color data that appear in the non-photo region image data;
   an input image character/background color difference calculation section that converts the character color data and the background color data extracted by the character/background color extraction section into first color coordinate value and second color coordinate value of a uniform color space, respectively, and calculates an input color difference between the character color data and background color data in the input image data by using the first color coordinate value and the second color coordinate value;
   an output image character/background color difference estimation section that converts the character color data and the background color data extracted by the character/background color extraction section into a third color coordinate value and a fourth color coordinate value of color space for output color image data, respectively, converts the third color coordinate value and the fourth color coordinate value to a fifth color coordinate value and a sixth color coordinate value of the uniform color space, respectively, estimates an output color difference between the character color data and the background color data in the output image data, from the fifth color coordinate value and the sixth color coordinate value, and outputs the estimated output color difference as data;

a color conversion parameter correction section that corrects a first color conversion parameter with respect to the extracted character color and background color on the basis of a relationship between the input color difference and the output color difference, and outputs a second color conversion parameter that is a correction result;

a first color conversion section that executes color conversion of the input color image data on the basis of the first color conversion parameter;

a second color conversion section that executes color conversion of the input color image data on the basis of the second color conversion parameter; and a color conversion switching section that selects and outputs, on the basis of the page layout information that is supplied from the layout analysis section, a color conversion result, which is delivered from the first color conversion section, as output color image data in a case where a pixel of interest belongs to the photo region, and selects and outputs a color conversion result, which is delivered from the second color conversion section, as output color image data in a case where a pixel of interest belongs to the non-photo region.

6. The color image processing apparatus according to claim 5, wherein the input image character/background color difference calculation section and the output image character/background color difference estimation section calculate brightness differences as character/background color differences that are to be delivered to the color conversion parameter correction section.

7. The color image processing apparatus according to claim 5, wherein only in a case where a color-difference increment, which is obtained by subtracting the input color difference from the output color difference is less than a predetermined threshold, the color conversion parameter correction section corrects either or both of the character color and background color in the color conversion parameter such that the color-difference increment becomes the threshold or more.

8. The color image processing apparatus according to claim 5, wherein only in a case where a color-difference ratio of the output color difference to the input color difference is less than a predetermined threshold, the color conversion parameter correction section corrects either or both of the character color and background color in the color conversion parameter such that the color-difference ratio becomes the threshold or more.

* * * * *